2,902,400
Patented Sept. 1, 1959

2,902,400
METHODS FOR PRODUCING LIQUID OLIGODYNAMIC COMPOSITIONS

Zdenek Vaclav Moudry and Marie Klementine Moudry, Northfield, Ill.

No Drawing. Application May 8, 1956
Serial No. 583,376

3 Claims. (Cl. 167—14)

This invention relates to an improved method for producing liquid oligodynamic compositions and particularly to the production of stable, aqueous dispersions of oligodynamic metal microparticles which are especially useful as algaecides for treating the waters of swimming pools, aquaria, and the like.

Oligodynamic metal compositions have long been known and used with varying degrees of success in many applications where it is desirable to control microorganisms. In prior work, most compositions have been based primarily upon effective amounts of oligodynamic silver, the production of colloidal dispersions of silver microparticles by reducing aqueous solutions of silver nitrate in the presence of a protective colloid being a popular procedure for obtaining such compositions. The desirability of incorporating oligodynamic copper particles in a dispersion of silver particles has also long been recognized. However, even working with silver alone, it has heretofore been difficult to prepare aqueous oligodynamic dispersions which would be acceptable as algaecides for treating waters in swimming pools and the like. One of the primary difficulties involved has been that the prior art compositions have caused the treated waters to assume an objectionable yellow or greenish cast when the compositions are used in proportions effective to combat algae and other organisms. It appears that this disadvantage has resulted both because of the presence of unreduced silver in the composition, and because of inability to accurately control the particle size of the oligodynamic metal. When it has been attempted to incorporate oligodynamic copper in such liquid compositions, even greater difficulties have been encountered. In fact, it appears that the prior art has been entirely unable to produce satisfactory aqueous oligodynamic copper dispersions by the reduction of water-soluble cupric salts.

In one embodiment, the present invention provides a method for producing stable aqueous dispersions of oligodynamic silver which are not only substantially entirely free of ionic silver, but which also contain oligodynamic particles of such a size that the composition is opalescent in concentrated form and colorless when diluted with water in proportions on the order of 1:50,000.

In a second embodiment, the invention accomplishes these same results while also providing in the dispersions metallic copper microparticles having the same general particle size as do the silver particles obtained.

In this respect, the present invention is related to that disclosed and claimed in my copending application, Serial Number 583,375, filed of even date herewith. Said copending application is directed more broadly to the simultaneous reduction of silver and cupric salts to produce oligodynamic silver and copper, while this embodiment of the present invention is directed to such a procedure wherein the product contains silver and copper particles in the range of 200–700 A.U., is opalescent in concentrated form and colorless when diluted with water in proportions on the order of 1:50,000, does not gel at ordinary temperatures, and is especially useful as an algaecide for swimming pool waters and the like.

In general, the invention involves the reduction of silver nitrate in aqueous solution, in the presence of a selected gelatin and under controlled process conditions, by means of a reducing medium comprising sodium sulfite and a reducing agent selected from the group consisting of hydroquinone and tannic acid.

We first prepare a dispersion of a selected gelatin in distilled water. The gelatin employed is one which is free of sulfur and ionizable halogen and which has a viscosity of 20–40 millipoises in 6⅔% aqueous solution at 60° C., a pH of 3–5.5, an isoelectric point of pH 7.8–8.3 and an ash analysis of 0.3–2.0%, the ash being substantially all calcium. Such a gelatin is produced by Charles B. Knox Gelatine Company, Johnstown, New York, and identified as Knox Gelatine #841. This gelatin is produced from fresh-frozen pork skins by first acid-treating the skins and then subjecting them to acid hydrolysis. During acid hydrolysis, the collagen is progressively hydrolyzed to gelatin and, as hydrolysis proceeds, the characteristics above referred to vary progressively. The changing characteristics are observed, and the selected gelatin is withdrawn at the proper stage.

Having prepared the dispersion of selected gelatin, the next step is to adjust the pH of the gelatin dispersion to about 9.3. A solution of silver nitrate in distilled water is then prepared. The gelatin dispersion and the silver nitrate solution are then uniformly combined at a temperature not exceeding 50° C., in such proportions that the gelatin constitutes 0.5–2.0% by weight of the total mixture. To this mixture is then added a reducing medium comprising sodium sulfite and hydroquinone (or tannic acid) in equal amounts, the combined weight of the sodium sulfite and reducing agent being 0.5–2.0% of the weight of silver nitrate employed. The silver nitrate may constitute as much as 10% of the total mixture.

The following example is illustrative:

Example I

One gram of Knox Gelatine #841, manufactured by Charles B. Knox Gelatine Company, Johnstown, New York, was dispersed in 100 cc. of distilled water. The gelatin had a gel strength of 165, a viscosity of 30 millipoises, a pH of 4.44, an isoelectric point of pH 8, and an ash analysis of 1.2%, almost all of the ash being calcium. The gelatin was substantially entirely free of sulfur and ionizable halogen.

Three grams of reagent grave silver nitrate was dissolved in 100 cc. of distilled water. A reducing medium was prepared by dissolving 1 g. sodium sulfite and 1 g. hydroquinone in 100 cc. of distilled water.

The gelatin dispersion was then adjusted to pH 9.3 by addition of sodium hydroxide. With the gelatin dispersion at 50° C., 50 cc. of the silver nitrate solution was added and the mixture stirred thoroughly. Two cc. of the sodium sulfite-hydroquinone solution was then added and the mixture stirred for 5 minutes.

The resulting composition was an odorless, tasteless, opalescent dispersion of silver microparticles predominantly 200–700 A.U. in size. There was no observable precipitated silver. Exposure to ultraviolet light at an intensity and for a period calculated to equal the actinic light of four summer months resulted in no precipitation of silver and no change in color, indicating that, for practical purposes, the composition was nonphotosensitive. Diluted with water to provide a concentration of 1:50,000, the composition was transparent and colorless; there was no observable reflection of yellow or green. The composition was stable at all temperatures from 5° C. to 60° C., and showed no tendency to coagulate at these temperatures.

The hydroquinone of Example I can be replaced by an equal amount of tannic acid, the resulting composition being equivalent in all respects to that just described.

Whether hydroquinone or tannic acid is used, the reducing agent must be accompanied by a substantially equal amount of sodium sulfite. It appears that the reducing agent, if used alone, forms undesirable oxidation products which make the composition unstable, cause precipitation of silver, and result in formation of unduly large silver particles. The sodium sulfite employed serves to react with such oxidation products and to deactivate the same. We have found that it is only possible to obtain silver dispersions wherein the particles lie within the range of 200–700 A.U. by this procedure if the decomposition products of the reducing agent are prevented from entering chemically into the silver reduction system. If an excess of sodium sulfite is employed, that is, materially more than an amount by weight equal to that of the reducing agent, incomplete reduction will result. On the other hand, an excess of the reducing agent results in instability of the composition.

Satisfactory dispersions are obtained if the special gelatin referred to is used in amounts as low as 0.5% by weight of the total mixture of the silver nitrate solution and gelatin dispersion. When larger proportions of silver nitrate are used, in order to obtain a greater concentration of oligodynamic silver in the composition, the gelatin content may be increased. However, the gelatin should not exceed about 2% by weight, else the composition obtained will gel at room temperature.

Adjustment of the pH of the gelatin dispersion to about 9.3, and maintenance of a temperature not substantially exceeding 50° C. during the process, are process conditions essential to obtaining complete reduction and the production of silver micro-particles in the desired range of 200–700 A.U.

We have also discovered that, if both silver nitrate and a soluble cupric salt selected from the group consisting of copper nitrate and copper sulfate are employed in the process, there results not only complete reduction of the silver to microparticles of 200–700 A.U., but also all or substantially all of the copper will be promptly reduced to metallic microparticles of the same size range. Since the production of satisfactory aqueous dispersions of oligodynamic copper microparticles of any effective particle size range by reduction of cupric salts has apparently not been achieved by prior art procedures, this result is surprising.

*Example II*

100 cc. of a 5% aqueous dispersion of the same gelatin employed in Example I was prepared and adjusted to a pH of 9.3.

3 grams of silver nitrate and 1.5 grams of cupric nitrate were dissolved in 100 cc. of distilled water. The 50 cc. of the resulting solution of silver nitrate and cupric nitrate was combined with the full amount of the gelatin dispersion.

A reducing solution was prepared by dissolving one gram of sodium sulfite and one gram of tannic acid in 100 cc. of distilled water. 2 cc. of this reducing medium was added to the mixture just prepared and the mixture was stirred for 5 minutes.

The original salt solution exhibited the characteristic blue color of ionic copper. After the reducing agent had been uniformly distributed through the mixture, the blue color entirely disappeared, the aqueous mixture becoming water white and opalescent. At the end of the 5 minute period, a test for ionic copper was completely negative. The composition produced in Example II had all of the characteristics of that produced in Example I, except that, in addition to the oligodynamic silver particles, the composition of Example II contained oligodynamic copper particles predominantly within the size range of 200–700 A.U.

When carrying out simultaneous reduction of both silver and copper in accordance with the present invention, the amount of silver salt employed should at least equal the amount of copper salt. The silver salt may be employed in proportions as much as 3 times the weight of the copper salt. Again, in this embodiment, the silver nitrate content must be kept to a maximum of about 10% by weight of the total reduction mixture, in order that the reduced metal will be maintained in stable dispersion by the gelatin. The proportion of gelatin remains at 0.5–2% by weight of the total reduction mixture. Surprisingly, the fact that cupric salt is employed in addition to the silver nitrate does not necessitate an increase in the amount of gelatin employed.

The cupric nitrate of Example II may be replaced with an equivalent amount of copper sulfate, the same procedure followed, and substantially the same result obtained.

When both a silver salt and a cupric salt are employed in accordance with the invention, as in Example I, most of the oligodynamic microparticles are composed of both silver and copper, there also being a relatively small proportion of oligodynamic microparticles of silver and oligodynamic microparticles of copper. Even though the major part of the microparticulate product contains both silver and copper in each particle, the particles are predominantly within the range of 200–700 A.U.

The combined silver-copper compositions of the invention, such as the composition of Example II, are superior in activity to compositions containing only oligodynamic silver. Thus, the composition of Example II is superior, in combatting algae and bacteria, to the composition of Example I. This being so, it would appear that there is a synergistic relation between oligodynamic copper and oligodynamic silver. However this may be, we have found that the products of this invention, wherein the major proportion of the microparticles each contain both copper and silver, are significantly superior to mere admixtures of oligodynamic copper microparticles and silver microparticles.

In accordance with this embodiment, the silver salt may be employed in the original solution, as in Example II, so that the silver is reduced simultaneously with reduction of the cupric copper first to cuprous and then to elemental copper. If desired, however, the cupric salt may first be reduced to the cuprous state, the silver then added, and reduction of both salts then effected, as seen in the following example:

*Example III*

The same proportions as in Example II were employed. The cupric nitrate was dissolved in water and 50 cc. of this solution added to the gelatin dispersion, after the dispersion had been adjusted to pH 9.3, maintaining the temperature at a maximum of 50° C. The resulting aqueous mixture displayed the characteristic blue color of cupric copper. The reducing medium was then added and the resulting mixture was thoroughly agitated. The mixture then changed from blue to the green color characteristic of cuprous copper. The silver nitrate was then added and the mixture stirred for five minutes. At the end of this time, the green color of cuprous copper had entirely disappeared and the mixture was opalescent and water-white.

The composition resulting from the method of Example 3 has all of the characteristics of the composition produced in Example II.

From this last example, it will be evident that cupric salts may be readily reduced to the cuprous state, whether ionic silver is present or not. However, we have found that further reduction of the copper does not occur unless the silver is added. It is thus apparent that presence of the silver is essential if complete and prompt reduction of the copper to oligodynamic microparticles is to be accomplished. While the precise reason for this phenomenon is not known with certainty, it appears that, upon addition of the silver, there is obtained an oxidation-reduction system in which the silver supplies an electron necessary for reduction of the copper to the elemental state.

To illustrate the effectiveness of the compositions of the invention, algae control tests were carried out as follows: 400 cc. of sterile, demineralized water was added to each of several one-liter flasks, and 100 cc. of sterile dirt extract then added to each flask. 1 cc. quantities of an actively growing culture of mixed algae (green and blue-green) and diatoms were introduced into each flask.

One such flask was retained as a control, with no toxicant added thereto. In other flasks, an amount of the composition of Example I sufficient to provide a concentration of 1:50,000 was added. In others, an amount of the composition of Example II sufficient to provide a concentration of 1:50,000 was added. Finally, to one flask was added 5 parts per million of copper sulfate. The flasks were so arranged that filtered air could be bubbled through the liquid. All flasks were continuously and equally lighted throughout the tests.

After one month, the control showed a heavy growth of green and blue-green algae. The flask treated with copper sulfate showed evidence of algae growth at about seven days, and a moderately heavy growth at the end of two weeks. At the end of one month, the liquid in the flasks treated with the compositions of Examples I and II was clear, and microscopic examination disclosed no viable algae.

Tested against bacteria, the oligodynamic silver compositions of Example I were found to have a mean logarithmic decay constant of 1.15, while that of the silver-copper compositions of Example II was found to be 1.4.

As has been mentioned previously herein, prior-art compositions have frequently been unsatisfactory for treating swimming pool waters because such compositions tend to give the water a yellowish color, so that the blue sky is reflected as green, resulting in an unattractive appearance. We have found that this disadvantage is entirely overcome in the present invention, since the invention makes possible, for the first time, the production of oligodynamic metal dispersions which, because of the size range of the dispersed particles, lend no color to the water being treated.

We claim:

1. A method for producing oligodynamic compositions particularly useful as algaecides, such compositions containing effective proportions of silver microparticles within the size range of 200–700 A.U., being substantially completely free of unreduced silver, opalescent in concentrated form, colorless when diluted with water in proportions on the order of 1:50,000, stable at temperatures on the order of 5–60° C., non-photosensitive, odorless, tasteless and non-toxic to humans and plant life, comprising forming an aqueous dispersion of an ionizable-halogen-free, sulfur-free gelatin having a viscosity of 20–40 millipoises in 6⅔% aqueous solution at 60° C., a pH of 3–5.1, and an isoelectric point of pH 7.8–8.3, adjusting the pH of such gelatin dispersion to about 9.3, combining such dispersion at a temperature not exceeding 50° C. with an aqueous solution of silver nitrate in proportions such that the gelatin content of the total mixture is 0.5–2.0% by weight, and then intimately mixing such aqueous mixture with a reducing medium comprising equal parts by weight of sodium sulfite and a reducing agent selected from the group consisting of hydroquinone and tannic acid, said reducing medium constituting 0.5–2.0% by weight of the silver nitrate employed and the silver nitrate constituting not more than 10% by weight of the total mixture.

2. A method for producing an oligodynamic colloidal dispersion of microparticulate silver and copper wherein the microparticulate particles are within the range of 200–700 A.U., such dispersions being opalescent in concentrated form and colorless when diluted with water in proportions on the order of 1:50,000, substantially completely free of unreduced silver and copper and stable at temperatures on the order of 5–60° C., non-photosensitive, and non-toxic to humans and plant life, comprising forming an aqueous dispersion of an ionizable-halogen-free, sulfur-free gelatin having a viscosity of 20–40 millipoises in 6⅔% aqueous solution at 60° C., a pH of 3–5.5 and an isoelectric point of pH 7.8–8.3, adjusting the pH of such gelatin dispersion to about 9.3, combining such dispersion at a temperature not exceeding 50° C., with an aqueous solution of silver nitrate and a water-soluble cupric salt the anion of which does not precipitate silver, in proportions such that the gelatin content of the mixture is 0.5–2.0% by weight, and then intimately mixing such aqueous mixture with a reducing medium comprising equal parts by weight of sodium sulfite and a reducing agent selected from the group consisting of hydroquinone and tannic acid, the combined weight of sodium sulfite and said reducing agent constituting 0.5–2.0% by weight of the silver nitrate and cupric salt employed, the proportion of silver nitrate not exceeding 10% by weight of the total mixture, and the weight ratio of silver nitrate to cupric salt being 1:1–3:1.

3. A method for producing an oligodynamic dispersion of silver and copper microparticles in the range of 200–700 A.U., such dispersion being opalescent in concentrated form, colorless when diluted with water in proportions on the order of 1:50,000, substantially completely free of unreduced silver and copper, stable at temperatures of 5–60° C., non-photosensitive, and non-toxic to humans and plant life, comprising forming an aqueous dispersion of an ionizable-halogen-free, sulfur-free gelatin having a viscosity of 20–40 millipoises in 6⅔% aqueous solution at 60° C., a pH in aqueous solution of 3–5.5, and an isoelectric point of pH 7.8–8.3, adjusting the pH of such dispersion to about 9.3, combining such dispersion, at a temperature not exceeding 50° C., with an aqueous solution of cupric nitrate in proportions such that the gelatin constitutes 0.5–2% by weight of the total mixture, and then reducing the cupric nitrate to metallic copper microparticles by intimately mixing said mixture with silver nitrate and equal proportions by weight of sodium sulfite and a reducing agent selected from the group consisting of hydroquinone and tannic acid, the weight ratio of silver nitrate to cupric nitrate being in the range of 1:1–3:1, the weight of the silver nitrate not exceeding 10% by weight of the resulting mixture the combined weight of the sodium sulfite and reducing agent being in the range of 0.5–2% of the combined weight of silver nitrate and cupric nitrate.

References Cited in the file of this patent

UNITED STATES PATENTS

| 2,132,886 | Voelker | Oct. 11, 1938 |

FOREIGN PATENTS

| 431,656 | Great Britain | July 12, 1935 |
| 593,394 | Great Britain | Oct. 15, 1947 |

OTHER REFERENCES

The Glass Ind., vol. 26, No. 3, March 1945, pp. 136–142 (p. 138 pert.).

Yagi: Rec. Phys. Chem., Japan, vol. 14, 1940, pp. 115–127; thru Chem. Abs., vol. 35, p. 4264.

UNITED STATES PATENT OFFICE
CERTIFICATE OF CORRECTION

Patent No. 2,902,400                                               September 1, 1959

Zdenek Vaclav Moudry et al.

It is hereby certified that error appears in the printed specification of the above numbered patent requiring correction and that the said Letters Patent should read as corrected below.

Column 2, line 1, for "aind" read -- and --; column 5, line 60, for "3-5.1" read -- 3-5.5 --.

Signed and sealed this 7th day of June 1960.

(SEAL)
Attest:

KARL H. AXLINE
Attesting Officer

ROBERT C. WATSON
Commissioner of Patents